US010174157B2

(12) United States Patent
Bastioli et al.

(10) Patent No.: US 10,174,157 B2
(45) Date of Patent: *Jan. 8, 2019

(54) BIODEGRADABLE ALIPHATIC-AROMATIC POLYESTER

(75) Inventors: Catia Bastioli, Novara (IT); Giampietro Borsotti, Novara (IT); Luigi Capuzzi, Novara (IT); Gian Tomaso Masala, Novara (IT); Tiziana Milizia, Novara (IT); Roberto Vallero, Borgo D'ale (IT)

(73) Assignee: NOVAMONT S.P.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/508,153

(22) PCT Filed: Nov. 5, 2010

(86) PCT No.: PCT/EP2010/066901
§ 371 (c)(1),
(2), (4) Date: May 4, 2012

(87) PCT Pub. No.: WO2011/054926
PCT Pub. Date: May 12, 2011

(65) Prior Publication Data
US 2012/0220680 A1 Aug. 30, 2012

(30) Foreign Application Priority Data

Nov. 6, 2009 (IT) .............................. MI2009A1943

(51) Int. Cl.
C08G 63/183 (2006.01)
C08L 67/02 (2006.01)

(52) U.S. Cl.
CPC ............ C08G 63/183 (2013.01); C08L 67/02 (2013.01)

(58) Field of Classification Search
CPC .. C08G 63/672; C08G 18/285; C08G 63/676; C08G 18/42; C08G 18/674; C08G 18/757; C08G 18/7664; C08G 18/792; C08G 2170/20; C08G 63/181; C08G 63/668; C08G 18/3834; C08G 63/183; C08G 63/916; C08G 59/1433; C08G 59/226; C08G 59/4078; C08G 59/72; C08G 75/12; C08G 18/3206; C08G 18/6492; C08G 18/73; C08G 18/4225; C08G 18/664; C08L 67/02; C08L 101/00; C08L 101/16; C08L 67/025; C08L 67/04
See application file for complete search history.

(56) References Cited

U.S. PATENT DOCUMENTS

| 2,551,731 | A | 5/1951 | Drewitt |
| 3,190,853 | A | 6/1965 | Watson |
| 8,193,298 | B2 | 6/2012 | Bastioli et al. |
| 8,420,769 | B2 * | 4/2013 | Eritate .......................... 528/307 |
| 2012/0219740 | A1 * | 8/2012 | Bastioli et al. ............... 428/35.7 |

FOREIGN PATENT DOCUMENTS

| CN | 101142256 A | | 3/2008 |
| EP | 0118226 A1 | | 9/1984 |
| JP | 2008-291244 | * | 12/2008 |
| JP | 2009062465 A | | 3/2009 |
| WO | WO 2006/097353 | * | 9/2006 |
| WO | WO-2007/052847 A1 | | 5/2007 |
| WO | WO2009/104780 | * | 8/2009 |
| WO | WO-2009118377 A1 | | 10/2009 |
| WO | WO-2009/135921 A1 | | 11/2009 |
| WO | WO-2010/077133 A1 | | 7/2010 |

OTHER PUBLICATIONS

Medvedeva et al. "Mixed polyesters of ethylene glycol with 2,5-furandicarboxylic and terephthalic acids" Soviet Plastics, Feb. 1963, pp. 14-15.*
Gandini et al. "Furans in polymer chemistry", 1997.*
EU Standard EN 13432 Feb. 2000 ( filed by Applicant as evidence).*
Medvedeva et al., "Mixed polyesters of ethylene glycol with 2,5-furandicarboxylic and terephthalic acids", Sovient Plastics, No. 2, Feb. 1963, p. 14-15.
English abstract of JP20040349972, same as JP 2006-160787 Jun. 22, 2006.

* cited by examiner

Primary Examiner — Ling Siu Choi
Assistant Examiner — Gennadiy Mesh
(74) Attorney, Agent, or Firm — Polsinelli PC

(57) ABSTRACT

Disclosed are biodegradable aliphatic-aromatic polyesters obtained from aliphatic dicarboxylic acids, polyfunctional aromatic acids and diols, wherein the polyfunctional aromatic acids are constituted by mixtures of acids of renewable and synthetic origin its esters. In particular, the polyfunctional aromatic acids comprise at least one phthatic diacid and at least one heterocyclic aromatic diacid of renewable origin, which can be 2,5-furandicarboxylic acid and its esters. Also, provided are mixtures of the polyesters with other biodegradable polymers both of natural and synthetic origin.

20 Claims, No Drawings

BIODEGRADABLE ALIPHATIC-AROMATIC POLYESTER

CROSS REFERENCE TO RELATED APPLICATIONS

This application is a National Phase filing under 35 U.S.C. § 371 of PCT/EP2010/066901 filed on Nov. 5, 2010; and this application claims priority to Application No. MI2009A001943 filed in Italy on Nov. 6, 2009 under 35 U.S.C. § 119; the entire contents of all are hereby incorporated by reference.

The present invention relates to biodegradable aliphatic-aromatic polyesters comprising units derived from aliphatic dicarboxylic acids, polyfunctional aromatic acids and diols, wherein the units derived from polyfunctional aromatic acids comprise units derived from at least one phthatic diacid and at least one heterocyclic aromatic diacid of renewable origin.

The present invention also relates to mixtures of said polyesters with other biodegradable polymers both of natural and synthetic origin.

Biodegradable aliphatic-aromatic polyesters obtained starting from terephthalic acid, aliphatic diacids and diols are known in the literature and to the market. The presence of the aromatic component in the chain is relevant to obtain polymers with sufficiently high melting temperatures and with adequate crystallization rates.

Although an increase in terephthalic acid content improves the thermal and mechanical properties of polyesters of this type, a high content thereof decreases the percentage of biodegradation of said polyesters.

Moreover, terephthalic acid is of synthetic origin and any production thereof from renewable sources is too complex. This limits the ability of currently marketed polyesters of this type to reduce, to any great extent, environmental impact in terms of non-renewable carbon feedstock regardless of their biodegradability.

If it were possible to maintain suitable properties of biodegradation and in-use performances, the presence of an aromatic acid of renewable origin in the chain would therefore be desirable as it would allow a polymer to be obtained starting from feedstock from a renewable source for a very high percentage of total carbon. The use of monomers of vegetable origin in fact contributes to the decrease of $CO_2$ in the atmosphere and to the decrease of the use of non-renewable resources.

All the limits mentioned above are now overcome through the polyesters according to the present invention.

The present invention in fact relates to biodegradable aliphatic-aromatic polyesters comprising units derived from at least one diol, at least one aliphatic dicarboxylic acid and at least two polyfunctional aromatic acids, characterized in that the units derived from said polyfunctional aromatic acids comprise:

from 1 to 99% by moles, preferably from 5 to 95% and more preferably from 10 to 85%, of units from at least one phthalic aromatic diacid;

from 99 to 1% by moles, preferably from 95 to 5% and more preferably from 90 to 15%, of units from at least one heterocyclic aromatic diacid of renewable origin.

Products obtained from sources which, due to their intrinsic characteristics, are naturally regenerated or are not exhaustible in the time scale of human life and, by extension, whose use does not compromise natural resources for future generations, are considered as being of renewable origin. A typical example of renewable source is constituted by vegetable crops. With regard to aliphatic dicarboxylic acids, the dicarboxylic acids $C_2$-$C_{22}$ are taken into consideration herein.

Of the aliphatic diacids, those with number of C atoms in the main chain comprised between 2 and 22, esters and mixtures thereof are preferred, $C_4$ (succinic acid), $C_6$ (adipic acid), $C_7$ (pimelic acid), $C_8$ (suberic acid), $C_9$ (azelaic acid), $C_{10}$ (sebacic acid), $C_{11}$ (undecandioic acid), $C_{12}$ (dodecandioic acid) and $C_{13}$ (brassylic acid), $C_{18}$ (octadecandioic acid) being particularly preferred. Of these, particularly preferred are aliphatic diacids from renewable sources and preferably $C_6$ (adipic acid), $C_8$ (suberic acid), $C_9$ (azelaic acid), $C_{10}$ (sebacic acid), $C_{11}$ (undecanedioic acid) $C_{12}$ (dodecandioic acid) and $C_{13}$ (brassylic acid), their esters and mixtures thereof. Even more preferred are aliphatic acids from renewable sources $C_9$ (azelaic acid), $C_{10}$ (sebacic acid) and their esters. Mixtures of these acids are also particularly interesting.

Diacids with unsaturations, such as itaconic and maleic acid, are also included.

The total content of aliphatic dicarboxylic acids in the biodegradable polyesters according to the present invention is comprised between 95 and 10%, preferably between 80 and 15%, more preferably between 60 and 20% and even more preferably between 50 and 25% by moles with respect to the total molar content of dicarboxylic acids.

In the polyesters according to the present invention the polyfunctional aromatic acids are constituted by mixtures of at least one phthatic diacid and at least one heterocyclic aromatic diacid of renewable origin.

Phthalic aromatic diacids for the purposes of the present invention are intended as aromatic compounds of the phthalic acid type and their esters, preferably terephthalic acid, its esters and/or mixtures thereof.

Heterocyclic aromatic diacids of renewable origin for the purposes of the present invention are intended as aromatic compounds of the furandicarboxylic acid type and their esters, preferably 2,5-furandicarboxylic acid, its esters and/or mixtures thereof.

Examples of diols for the purposes of the present invention are 1,2-ethanediol, 1,2-propanediol, 1,3-propanediol, 1,4-butanediol, 1,5-pentanediol, 1,6-hexanediol, 1,7-heptanedoil, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neo-pentylglycol, 2-methyl-1,3-propanediol, dianhydro-sorbitol, dianhydro-mannitol, dianhydroiditol, cyclohexanediol, cyclohexanemethanediol, aromatic diols such as phenols, furandiol, isosorbide and its derivatives.

Diols of the type $C_2$-$C_{10}$ are particularly preferred. The diols $C_2$-$C_4$ are even more preferred. Among these, 1,2-ethaniediol, 1,3-propandiol, 1,4-butanediol and mixtures thereof are particularly preferred. Advantageously, said diols are constituted by at least 50%, preferably at least 80% in moles by 1,4 butanediol with respect to the total diol content.

The molecular weight $M_n$ of the polyester according to the present invention is greater than 15,000. The polydispersity index $M_w/M_n$ is comprised between 1.5 and 10. The molecular weights Mn and Mw can be measured using Gel Permeation Chromatography (GPC). Determination can be conducted with the chromatography system maintained at 40° C., using a set of three columns in series (particle diameter of 5μ and porosity respectively of 500 Å, 1000 Å and 10000 Å), a refraction index detector, chloroform as eluent (flow rate 1 ml/min) and using polystyrene as standard of reference.

The polyester according to the present invention has an inherent viscosity (measured with Ubbelhode viscometer for solutions in $CHCl_3$ with concentration 0.2 g/dl at 25° C.) greater than 0.3 dl/g.

The polyesters according to the invention can contain, in addition to the basic monomers, at least one hydroxy acid in a quantity comprised between 0-49%, preferably between 0-30% by moles with respect to the moles of the aliphatic dicarboxylic acid. Examples of suitable hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactid acid. The hydroxy acids can be inserted in the chain as is or can also be made to react firstly with diacids or diols. Said hydroxy acids can be present with either a random or a block repeating units distribution.

Long bifunctional molecules also with function not in the terminal position can also be added in quantities not exceeding 10%. Examples are dimer acids, ricinoleic acid, and acids with epoxide functions.

Amines, amino acids and amino alcohols can also be present in percentages up to 30% by moles with respect to all the other components.

In the preparation process of the polyester according to the invention, one or more polyfunctional molecules can advantageously be added, in quantities comprised between 0.01 and 3% by moles with respect to the quantity of dicarboxylic acids (and any hydroxy acids), in order to obtain branched products. Examples of these molecules are glycerol, pentathritol, trimethylolpropane, citric acid, dipentaerythritol, monoanhydrosorbitol, monohydro-mannitol, acid triglycerides, undecylenic acid, triethanolamine, 1,1,2-etantricarboxylic acid; 1,1,2,2-etantetracarboxylic acid, 1,3,5 pentatricarboxylic acid, 1,2,3,4-cyclopentatetracarboxylic acid, malic aci, tartaric acid, 3-hydroxyglutaric acid, mucic acid, trihydroxyglutaric acid, hydroxy-isophthalic acid, hexantriol, sorbitol, trimethiletane, mannitol, 1,2,4 butantriol, xilitol, 1,2,4,4-tetrakis(hydroxymethyl)cyclohexane, arabitol, adonitol, iditol.

Although the polymers according to the present invention reach high performances without the need to add chain extenders such as isocyanates and isocyanurates, epoxides and in particular polyepoxides, oxazolines or carbodiimides, it is nonetheless possible to modify the properties thereof according to necessity.

The increase in molecular weight of the polyesters can advantageously be obtained, for example, through the addition of various organic peroxides during their extrusion processing. The increase in molecular weight of the biodegradable polyesters can easily be detected by observing the increase of the viscosity values following processing of the polyesters with peroxides.

The production process of the polyester according to the present invention can take place according to any one of the processes known to the state of the art. In particular, said polyester can advantageously be obtained with a polycondensation reaction.

Advantageously, the polymerization process of the polyester according to the present invention can be conducted in the presence of a suitable catalyst. By way of example, suitable catalysts can be organometallic compounds of tin, i.e. derivatives of stannoic acid, titanium compounds, such as ortho-butyl titanate, aluminum compounds such as Al-triisopropyl, antinomy compounds and zinc compounds.

Preferably, the polyester according to the present invention is obtainable by reacting at least one precursor polyester PP having at least one acid component and at least one diol component with compounds carrying groups which can react with OH and/or COOH groups, such as for example, polyepoxides and polycarbodiimides or with radical initiators.

Said compounds can be used also in mixture.

Said at least one precursor polyester PP may be of the aliphatic, aromatic or aliphatic-aromatic type.

The skilled person will easily be able to identify the actual molar ratios necessary with respect to the nature of the precursor polyesters PP so as to obtain the desired polyester.

Preferably, the polyester according to the present invention is obtainable by a reactive extrusion process.

Among radical initiators, preferred are peroxides and among peroxides particularly preferred are organic peroxides. Organic peroxides can advantageously selected from the group consisting of: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl) peroxydicarbonate and mixtures thereof.

Preferably, said peroxides are added to the at least one precursor polyester PP in a quantity of less than 0.1%, more preferably of 0.05% and even more preferably of 0.02% by weight. Examples of polyepoxides that can advantageously be used are all polyepoxides from epoxidized oils and/or from styrene—glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to to the at least one precursor polyester PP in a quantity of less than 2%, more preferably of 1% and even more preferably of 0,75% by weight.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly (isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis (ethylcarbodiimide) and mixtures thereof. Preferably, said carbodiimides are added to the at least one precursor polyester PP in a quantity of less than 1.5%, more preferably of 0.75% and even more preferably of 0.5% by weight.

Said at least one precursor polyester PP may preferably have an unsaturation content of 0.1-0.8 and more preferably of 0.2-0.7% in moles.

Said unsaturations can be generated in situ during the polymerization phase or during processing of the at least one precursor polyester PP, through the addition of suitable unsaturated monomers or suitable unsaturated chain terminators.

Particularly preferred are precursor polyesters PP with terminal unsaturations.

Among unsaturated chain terminators, preferred are those having formula:

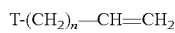

T-(CH$_2$)$_n$—CH=CH$_2$ wherein "T" is a group able to react with carboxylic and/or hydroxylic groups and "n" is an integer number comprised between 0 and 13.

Said unsaturated chain terminators can also be used in mixture.

With regard to "T", it is preferably selected from the group consisting of hydroxylic, carboxylic, amine, amide or ester group, hydroxylic or carboxylic groups being particularly preferred.

The integer "n" is preferably comprised between 1 and 13, more preferably 3 and 13, still more preferably 8 or 9, omega-undecenoic acid, omega-undecylenic alcohol and mixtures thereof being particularly preferred in order to maximize compatibility with polymers of natural origin.

Also after the preparation process, the polyester according to the present invention can have double bonds and/or adducts deriving from the reaction of the unsaturations with the radical initiators.

The presence of the unsaturations and/or adducts deriving from their reaction with the radical initiators can be determined with different methods well known to those skilled in the art, such as NMR spectroscopy or by methanolysis reactions of the polymer chain coupled with chromatographic methods combined with mass spectrometry.

The skilled person will easily be able to identify structures referable either to the unsaturations or to the reacted unsaturation after the reaction.

Preferably, the polyester according to the present invention is obtainable through a reactive extrusion process starting from a precursor polyester PP having a content of terminal acid groups in quantities of 30-150 meq of KOH/kg of the precursor polyester.

The measurement of terminal acid groups can be carried out as follows: 1.5-3 g of the polyester according to the invention are placed into a 100 ml Erlenmeyer flask. 60 ml of chloroform are added to dissolve the resin. After complete dissolution 25 ml of 2-propanol and, just before the determination, 1 ml of deionised water are added. The solution thus obtained is titrated with a preliminary standardized KOH/ethanol solution using a suitable indicator for the determination of the equivalence point of the titration, such as for example a glass electrode designed for use with nonaqueous acid-base titrations. The terminal acid group content is calculated from the consumption of the KOH/ethanol solution based on the following equation:

$$\text{Terminal acid group content (meq KOH/kg of polymer)} = \frac{\lfloor (V_{eq} - V_b) \cdot T \rfloor \cdot 1000}{P}$$

wherein:
$V_{eq}$=ml of KOH/ethanol solution at the equivalence point for the titration of the sample;
$V_b$=ml of KOH/ethanol solution necessary to arrive at pH=9,5 during the blank titration;
T=concentration in moles/l of the KOH/ethanol solution;
P=g of sample.

The polyester according to the present invention is biodegradable in industrial composting in accordance with the standard EN 13432.

The polyester according to the invention and blends thereof have properties and viscosity values which make them suitable to be used, appropriately modulating the relative molecular weight, for numerous practical applications, such as films, injection molding articles, extrusion coatings, fibers, foams, thermoformed articles, rubbers, glues, coatings, lacquers, thermosetting resins etc.

In particular, the polyesters according to the invention are suitable for the production of:
mono- and bi-oriented films, and films multilayered with other polymeric materials;
films for use in the agricultural sector, such as films for use in mulching;
cling films for use with foodstuffs, for bales in agriculture, and for wrapping waste;
bags and bin liners for the organic waste collection, such as the collection of food scraps and gardening waste;
seed dressings;
glues such as hot melt adhesives;
thermoformed foodstuff packaging, both mono- and multi-layered, as in containers for milk, yogurt, meats, beverages, etc;
coatings obtained using the extrusion coating method;
multilayer laminates with layers of paper, plastic, aluminum, or metalized films;
expanded or expandable beads for the production of pieces obtained by sintering;
expanded and semi-expanded products, including foam blocks formed using pre-expanded particles;
foam sheets, thermoformed foam sheets, and containers obtained from them for use in foodstuff packaging;
fruit and vegetable containers in general;
composites with gelatinized, destructurized and/or complexed starch, natural starch, flours or vegetable or inorganic natural fillers;
fibers, microfibers, composite microfibers wherein the core is constituted by rigid polymers such as PLA, PET, PTT and the shell is constituted by the material of the invention, blended composite fibers, fibers with different sections, from circular to multilobed, staple fibers, woven and nonwoven fabrics or spun bonded or thermobonded for use in sanitary and hygiene products, and in the agricultural and clothing sectors They can also be used in applications in place of plasticized PVC.

Polyesters of the present invention can also be used to produce biodegradable spandex-like elastomers, hot melts and other glues, polyesters for paints, coatings for paper treatment, matrices for inks.

The polyester according to the invention can be used in blends, which may also be obtained by reactive extrusion processes, with one or more polymers, which may or may not be biodegradable.

In the meaning of this invention by biodegradable polymers are meant biodegradable polymers according to standard EN 13432.

Particularly, the polyester according to the invention may be blended with biodegradable polyesters of the diacid-diol, hydroxyacid or polyester-ether type.

As far as the said biodegradable polyesters of the diacid-diol type are concerned, these may be either aliphatic or aliphatic-aromatic.

The biodegradable aliphatic polyesters from diacid-diols comprise units deriving from aliphatic diacids and aliphatic diols, while the biodegradable aliphatic-aromatic polyesters have an aromatic part mainly comprising polyfunctional aromatic acids of both synthetic and renewable origin, the aliphatic part being comprising by aliphatic diacids and aliphatic diols.

The aromatic aliphatic biodegradable polyesters from diacids-diols are preferably characterised by an aromatic acids content of between 30 and 90% in moles, preferably between 45 and 70% in moles with respect to the acid component.

Preferably the polyfunctional aromatic acids of synthetic origin are dicarboxylic aromatic compounds of the phthalic acid type and their esters, preferably terephthalic acid.

The polyfunctional aromatic acids of renewable origin are preferably selected from the group comprising 2,5-furandicarboxylic acid and its esters.

The aliphatic diacids of the biodegradable aliphatic-aromatic polyesters are aliphatic dicarboxylic acids such as oxalic acid, malonic acid, succinic acid, glucaric acid, adipic acid, pimelic acid, suberic acid, azelaic acid, sebacic acid, undecandioic acid, dodecanoic acid and brassilic acid, octadencadicarboxylic acid their esters and their mixtures. Among these, adipic acid and dicarboxylic acids from renewable sources are preferred, and among these dicarboxylic acids from renewable sources such as succinic acid, sebacic acid, azelaic acid, undecanedioic acid, dodecanedioic acid and brassylic acid and their mixtures are particularly preferred.

Examples of aliphatic diols in biodegradable polyesters from diacids-diols are: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, cyclohexanemethanediol and their mixtures. Of these, 1,4-butanediol, 1,3-propanediol and 1,2-ethanediol and their mixtures are particularly preferred.

Among biodegradable polyesters of the diacid-diol type, particularly preferred are aliphatic/aromatic copolyesters such as for example polybutylene terephthalate-co-sebacate, polybutylene terephthalate-co-azelate, polybutylene terephthalate-co-brassilate, polybutylene terephthalate-co-adipate, polybutylene terephthalate-co-succinate and polybutylene terephthalate-co-glutarate, and aliphatic polyesters such as for example polyalkylene succinates and particularly polybutylene succinate and its copolymers with adipic acid and lactic acid.

Preferably the blends of the polyester according to the invention with biodegradable polyesters from diacids-diols described above are characterised by a content of the said biodegradable polyesters which varies within the range between 1 and 99% by weight, more preferably between 5 and 95% by weight with respect to the sum of the weights of the composition according to the invention and the former respectively.

The preferred biodegradable polyesters from hydroxy acids include: poly-L-lactic acid, poly-D-lactic acid and poly-D-L-lactic acid stereocomplex, poly-ε-caprolactone, polyhydroxybutyrate, polyhydoxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate, polyhydroxybutyrate octadecanoate and poly-3-hydroxybutyrate-4-hydroxybutyrate. Among the biodegradable polyesters from hydroxy acids those particularly preferred are poly-L-lactic acid, poly-D-lactic acid and stereo-complex of poly-L-lactic and poly-D-lactic acid.

Preferably the blends of the polyester according to the invention with the biodegradable polyesters from hydroxy acids described above are characterised by a content of the said biodegradable polyesters which varies within the range between 1 and 99% by weight, more preferably between 5 and 95% by weight with respect to the sum of the weights of the composition according to the invention and the former respectively.

Advantageously, the polyester according to the invention may be blended with at least one polymer of natural origin selected from: starch, cellulose, chitin, chitosan, alginates, proteins such as gluten, zein, casein, collagen, gelatin, natural rubbers, rosin acid and its derivatives, lignins and their derivatives. Starches and celluloses can be modified and among these it is possible mentioning, for example, starch or cellulose esters with degree of substitution comprised between 0.2 and 2.5, hydroxypropylated starches, modified starches with fatty chains.

Among the polymers of natural origin above mentioned, starch is particularly preferred.

The term starch is intended herein as all types of starch, for example potato starch, corn starch, tapioca starch, pea starch, rice starch, wheat starch and also high-amylose starch—preferably containing more than 30% by weight of amylose—and waxy starches. Particularly preferred are also mixtures of starches.

The starch can be used in destructurized or gelatinized form or in filler form. Said starch can represent the continuous or dispersed phase or can be in co-continuous form. In the case of dispersed starch, the starch represent preferably an homogeneously dispersed phase of particles with mean dimensions of less than 1 µm, preferably less than 0.8 µm.

The dimensions of starch particles are measured in the transverse section with respect to the direction of the extrusion flow or, anyhow, with respect to the direction of material's output. For this purpose a sample of the blend which is to be examined is immersed in liquid nitrogen and subsequently fractured so as to obtain a fracture surface along a cross-section of the sample. The portion of the sample which is to be examined is then subjected to selective etching, dried and a thin layer of metal is deposited thereupon, for example a mixture of gold/palladium, using a "sputter coater". Finally the surface of the fracture is examined under a scanning electron microscope (SEM).

The dimension of starch particles is determined measuring the dimensions of the holes on the surface of the fracture after the selective etching of starch.

The mean dimension of the starch particles, i.e. the holes detectable on the etched surface of the fracture, is calculated as the numeral (or arithmetic) average of the particles dimensions.

In case of a spherical particle the dimension of the particle corresponds to the diameter of a circle corresponding to the bidimensional shape resulting from the transverse section. In case of a non-spherical particle the dimension (d) of the particle is calculated according to the following formula:

$$d=\sqrt{d_1 \cdot d_2}$$

where $d_1$ is the minor diameter and $d_2$ is the major diameter of the ellipse in which the particle can be inscribed or approximated.

The selective etching of starch dispersed phase, may be advantageously performed with HCl 5 N as etchant with an etching time of 20 minutes at an etching temperature of 25° C.

Blends containing destructurized starch are preferred.

Starches such as corn and potato starch, capable of being easily destructurizable and which have high initial molecular weights, have proven to be particularly advantageous.

The use of corn and potato starch is particularly preferred.

For destructurized starch, the teachings of EP-0 118 240 and EP-0 327 505 are referred to here, this being intended as starch processed so that it substantially has no "Maltese crosses" under the optical microscope in polarized light and no "ghosts" under the optical microscope in phase contrast.

Furthermore, physically and chemically modified starch grades can be used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches.

Starch blends wherein starch represent the dispersed phase can form biodegradable polymeric compositions with good-resistance to ageing and to humidity. Indeed, these polymeric compositions can maintain a high tear strength even in condition of low humidity.

Such characteristics can be achieved when the water content of the composition during mixing of the component is preferably kept between 1% and 15% by weight. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Descturized starch can be obtained before or during the mixing with the polyesters according to the present invention in presence of plasticizers such as water, glycerol, di and poly glycerols, ethylene or propylene glycol, ethylene and propylene diglycol, polyethylene glycol, polypropylenglycol, 1,2 propandiol, trymethylol ethane, trymethylol propane, pentaerytritol, dipentaerytritol, sorbitol, erytritol, xylitol, mannitol, sucrose, 1,3 propanediol, 1,2 butanediol, 1,3 butanediol, 1,4 butanediol, 1,5 pentanediol, 1,5 hexanediol, 1,6 hexanediol, 1,2,6 hexanetriol, 1,3,5 hexanetriol, neopentyl glycol and polyvinyl alcohol prepolymers and polymers, polyols acetates, ehtoxylates and propoxylates, particularly sorbitol ethoxylate, sorbitol acetate, and pentaerythritol acetate.

Water can be used as a plasticizer in combination with high boiling point plasticizers or alone during the plastification phase of starch before or during the mixing of the composition and can be removed at the needed level by degassing on one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids)

Esters with HLB values lower than 5.5 obtained from polyols and from fatty acids with 12-22 carbon atoms.

These compatibilizers can be used in quantities of from 0.2 to 40% weight and preferably from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of an hydrophilic and an hydrophobic units are particularly suitable. Additives such as di and polyepoxides, di and poly isocyanates, isocyanurates, polycarbodiimmides and peroxides can also be added. They can work as stabilizers as well as chain extenders.

All the products above can help to create the needed microstructure.

It is also possible to promote in situ reactions to create bonds between starch and the polymeric matrix. Also aliphatic-aromatic polymers chain extended with aliphatic or aromatic diisocyanates or di and polyepoxides or isocyanurates or with oxazolines with intrinsic viscosities higher than 1 dl/g or in any case aliphatic—aromatic polyesters with a ratio between Mn and MFI at 190° C., 2.16 kg higher than 10 000, preferably higher than 12 500 and more preferably higher than 15 000 can also be used to achieve the needed microstructure.

Another method to improve the microstructure is to achieve starch complexation in the starch-polyester mixture.

Said blends show good properties also in case of starch blends in which the starch is not strongly complexed. With regard to the complexation of the starch, the teachings contained in EP 965 615 have to be intended as incorporated in the present description. The presence of the complexes of starch with one hydrophobic polymer incompatible with the starch can be demonstrated by the presence in the X-ray diffraction spectra of a peak in the range of the 13-14° on the 2 theta scale. According to the present invention, with the wording compositions in which the starch is not strongly complexed are intended the compositions where the Hc/Ha ratio between the height of the peak (Hc) in the range of 13-14° of the complex and the height of the peak (Ha) of the amorphous starch which appears at about 20.5° is less than 0.15 and even less than 0.07.

Advantageously, said starch blends contain at least one plasticizer for the starch to provide suitable rheological properties. This plasticizer can simply be water (even the water contained in the native starch alone without the need for further additions), or high boiling or polymeric plasticizers of the type mentioned above. Mixtures of different plasticizers are also preferred.

The quantity of plasticizer is generally chosen on the basis of rheological needs and of the mixing system. In any case, plasticizers are advantageously added in a quantity of less than 30%, preferably less than 20%, still more preferably less than 10% in weight in relation to the starch on a dry basis.

Besides water, plasticizers that can be utilized in the compositions according to the invention are high boiling or polymeric plasticizers.

In the meaning of the present invention, high boiling plasticizers are meant plasticizers with boiling point higher than 250° C. Among these, those described in WO 92/14782, glycerol, diglycerol, triglycerol and tetraglycerol and mixtures thereof are preferred.

Particularly preferred are also mixtures of high boiling plasticizers containing at least 75% in weight, preferably 90% in weight of diglycerol, triglycerol and tetraglycerol. Said mixtures contain more than 50% in weight, preferably more than 80% in weight of diglycerol with respect to the total weight of diglycerol, triglycerol and tetraglycerol. The use of this type of high boiling plasticizers is particularly preferred as they prevent problems with fumes in processing environments and there are no frequent shutdowns made necessary for cleaning the machines during the composition processing.

In the meaning of the present patent application, with the term diglycerol are herein meant all compounds deriving from condensation reactions of two molecules of glycerol, such as alpha-alpha' diglycerol, alpha-beta diglycerol, beta-beta' diglycerol, their various cyclic isomers and mixtures thereof. As far as diglycerol is concerned, particularly preferred are mixtures comprising at least 70% in weight of alpha-alpha' diglycerol.

Starch blends containing water as the only plasticizer are also preferred. Among these, mixtures containing the water present in native starch as the only plasticizer particularly preferred.

Preferably, blends with polymers of natural origin are characterized by a content of the said polymers of natural origin which varies within the range between 1 and 99% by weight, more preferably between 5 and 95% by weight and more preferably between 10 and 40% by weight with respect to the sum of the weights of the polyester according to the invention and the former respectively.

The polyester according to the invention may also be blended with polyolefins, non-biodegradable polyesters, polyester- and polyether-urethanes, polyurethanes, polyamides, polyamino acids, polyethers, polyureas, polycarbonates and mixtures thereof.

Among the polyolefins, polyethylene, polypropylene, their copolymers, polyvinyl alcohol, polyvinyl acetate, polyethylvinyl acetate and polyethylenevinyl alcohol are preferred. Among the non-biodegradable polyesters, PET, PBT, PTT in particular with a renewables content >30% and polyalkylene furandicarboxylates are preferred. Among the latter polyethylene furandicarboxylate, polypropylene furandicarboxylate, polybutylene furandicarboxylate and their mixtures are preferred.

Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11 and 6/12 type.

The polycarbonates may be polyethylene carbonates, polypropylene carbonates, polybutylene carbonates and their mixtures and copolymers.

The polyethers may be polyethylene glycols, polypropylene glycols, polybutylene glycols, their copolymers and their mixtures having molecular weights between 70,000 and 500,000.

Preferably the blends of the composition according to the invention with the polymers described above (polyolefins, non-biodegradable polyesters, polyester- and polyether-urethanes, polyurethanes, polyamides, polyamino acids, polyethers, polyureas, polycarbonates and mixtures thereof) are characterised by a content of the said polymers which varies within the range from 0.5 to 99% by weight, more preferably from 5 to 50% by weight with respect to the sum of the weights of the composition according to the invention and the former respectively.

The polyester according to the invention can advantageously be used in blends with 5-30%, preferably 7-25% by weight of at least one rigid polymer with a modulus greater than 1,500 MPa. Said at least rigid polymer can be present as a further dispersed phase as well in lamellar structures or mixtures thereof.

As far as said further dispersed phase is concerned, said at least rigid polymer forms an homogeneously dispersed phase of particles with mean dimensions of less than 2 μm, preferably less than 1 μm.

The dimensions of said particles are measured according to the method of measurement above disclosed for starch particles.

Among rigid polymers, particularly preferred are polyhydroxyalkanoates, such as polylactic acid and polyglycolic acid and more preferably polymers or copolymers of polylactic acid containing at least 75% of L-lactic or D-lactic acid or combinations thereof, advantageously with molecular weight Mw greater than 70,000. Said rigid polymers can also be plasticized.

The selective etching of polylactic acid dispersed phase, may be advantageously performed with acetone as etchant with an etching time of 5 minutes at an etching temperature of 25° C. The polyesters according to the invention can also be used in blends with the polymers of synthetic origin and polymers of natural origin mentioned above. Mixtures of polyesters with starch and polylactic acid are particularly preferred.

The blends of the polyester according to the present invention with one or more polymers of the type mentioned above are particularly suitable for the production of films. Advantageously, the films obtained with said blends show excellent mechanical properties as well as high thermal resistance.

Blends of the polyester according the present invention with PLA are of particular interest because their high compatibility with PLA polymers and copolymers permits to cover materials with a wide range of rigidities—which makes these blends particularly suitable for injection molding and extrusion.

To improve the transparency and toughness of such blends and decrease or avoid a lamellar structure of polylactide polymers, it is possible to introduce other polymers as compatibilizers or toughening agents such as: polybutylene succinate and copolymers with adipic acid and or lactic acid and or hydroxyl caproic acid, polycaprolactone, aliphatic polymers of diols from C2 to C13 and diacids from C4 to C13, polyhydroxyalkanoates, polyvinylalcohol in the range of hydrolysis degree between 75 and 99% and its copolymers, polyvinylacetate in a range of hydrolysis degree between 0 and 70%, preferably between 0 and 60%. Particularly preferred as diols are ethylene glycol, propandiol, butandiol and as acids: azelaic, sebacic, undecandioic acid, dodecandioic acid, brassylic acid and their combinations.

To maximize compatibility among the polyester of the invention and polylactic acid it is very useful the introduction of copolymers with blocks having high affinity for the aliphatic-aromatic copolyesters of the invention, and blocks with affinity for the lactic acid polymers or copolymers. Particularly preferred examples are block copolymers of aliphatic aromatic copolyesters with polylactic acid. Such block copolymers can be obtained taking the two original polymers terminated with hydroxyl groups and then reacting such polymers with chain extenders able to react with hydroxyl groups such as diisocyanates. Examples are 1,6 hexamethylene diisocyanate, isophorone diisocyanate, methylene diphenildiisocyanate, toluene diisocyanate or the like. It is also possible to use chain extenders able to react with carboxylic groups like di and poly epoxides (e.g. bisphenols diglycidyl ethers, glycerol diglycidyl ethers) divinyl derivatives if the polymers of the blend are terminated with acid groups. It is possible also to use as chain extenders carbodiimmides, bis-oxazolines, isocyanurates etc.

The intrinsic viscosity of such block copolymers can be between 0.3 and 1.5 dl/g, more preferably between 0.45 and 1.2 dl/g. The amount of compatibilizer in the blend of aliphatic-aromatic copolyesters and polylactic acid can be in the range between 0.5 and 50%, more preferably between 1 and 30%, more preferably between 2 and 20% by weight.

The mixture according to the present invention can advantageously be blended also with nucleating agents and filler both of organic and inorganic nature.

Examples of nucleating agents include talc, saccharine sodium salt, calcium silicate, sodium benzoate, calcium titanate, boron nitride, zinc salts, porphyrin, chlorine, phlorin, porphodimethine, porphomethine, bacteriochlorin, isobacteriochorin, porphyrinogen, phorbin, isotactic polypropylene, PLA with low molecular weight and PBT.

The preferred amount of fillers is in the range of 0.5-70% by weight, preferably 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, preferably less than 500 ntn, more preferably less than 300 nm, and even more preferably less than 50 nm. Particularly preferred are zeolites and silicates of various kindsuch as wollastonites, montmorillonites, hydrotalcites also functionalised with molecules able to interact with starch and or the specific polyester. The use of such fillers can improve stiffness, water and gas permeability, dimensional stability and maintain transparency.

The blends comprising the polyester according to the present invention can be prepared by means of an extruder or any other machine capable of providing temperature and shear conditions that allows an homogeneous mixing of the components.

Said blends are advantageously obtainable by reactive extrusion process with compounds carrying groups which can react with OH and/or COOH groups, such as for example, polyepoxides and polycarbodiimides or unsaturated bonds such as for example peroxides.

Examples of peroxides that can advantageously be used are selected from the group of dialkyl peroxides, such as: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl)peroxydicarbonate and mixtures thereof.

Preferably, said peroxides are added to the polyesters according to the invention in a quantity of less than 0.5%, more preferably of 0.2% and even more preferably of 0.1% by weight. Examples of polyepoxides that can advantageously be used are all polyepoxides from epoxidized oils and/or from styrene—glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxies per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to the polyesters according to the invention in a quantity of less than 2%, more preferably of 1% and even more preferably of 0.75% by weight.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis (ethylcarbodiimide) and mixtures thereof.

Preferably, said carbodiimides are added to the polyesters according to the invention in a quantity of less than 1.5%, more preferably of 0.75% and even more preferably of 0.5% by weight.

The invention is now illustrated by describing several embodiments, which shall be intended as nonlimiting examples of the inventive concept protected by the present patent.

EXAMPLES

Example 1

Synthesis of Poly(Butylene Furandicarboxylate-co-Butylene Terephthalate-co-Butylene Sebacate) with 60 mol % of Butylene Furandicarboxylate Units, 10 mol % of Butylene Terephthalate Units and 30 mol % of Butylene Sebacate Units The following were loaded in a 1 lt glass reactor with two necks fitted with a sealed mechanical agitator and a water cooler connected to a graduated test tube for collecting the distillate:

| | |
|---|---|
| dimethyl ester of 2,5-furandicarboxylic acid (DMFD) | 49.11 g (0.267 moles) |
| dimethyl ester of terephthalic acid (DMT) | 8.63 g (0.044 moles) |
| sebacic acid | 26.96 g (0.133 moles) |
| 1,4-butanediol | 55.94 g (0.622 moles) |

Esterification

The glass reactor was immersed in a thermostatically-controlled oil bath at a temperature of 200° C. and stirred continuously at 400 RPM.

Water and methanol are distilled during the reaction. Distillation was left to proceed for one hour, after which 100 ppm of tetraorthobutyl titanate (Tyzor®, marketed by DuPont) were added as an esterification catalyst and the temperature of the oil bath was gradually raised to 235° C. over the course of three hours. The conversion achieved, calculated as the ratio between the quantity of distillates retrieved during the reaction vis-à-vis the quantity theoretically obtainable was approximately 87%.

Polycondensation Phase

The water cooler was subsequently replaced with an air cooler fitted with a coded and graduated test-tube for the collection of the distillates and a further 1000 ppm of Tyzor® were added as the polycondensation catalyst. The pressure was reduced to 1 mbar over a period of approximately 10 minutes.

The reaction was protracted for 4 hours, bringing the temperature of the oil up to 240° C. A product was obtained with an inherent viscosity measured in chloroform at 25° C. (2 g/l) according to the ASTM standard D 2857-89 equal to 0.76 dl/g.

The product thus obtained was subjected to the determination of the Melting Temperature ($T_m$).

With the regard to the Melting Temperature ($T_m$), it was determined on a 3-6 mg sample by means of Differential Scanning calorimetry (DSC) with a differential scanning calorimeter Perkin Elmer Diamond operating with the following thermal profile:

30 seconds of thermal equilibration at −20° C.;

Scan from −20 to 200° C. at 20° C./min;

$T_m$ was measured as the maximum of the endothermic peak during the scan obtaining the following results:

Melting Temperature ($T_m$)=102° C.,

The polymer was characterised in as much as concerned with mechanical properties according to the ASTM D638 standard.

Mechanical Properties

| | |
|---|---|
| Stress at break (MPa) | 43 |
| Elongation at break (%) | 750 |
| Elastic modulus (MPa) | 105 |

Example 2

Synthesis of Poly(Butylene Furandicarboxylate-co-Butylene Terephthalate-co-Butylene Sebacate) with 25 mol % of Butylene Furandicarboxylate Units, 45 mol % of Butylene Terephthalate Units and 30 mol % of Butylene Sebacate Units The following were loaded in a 1 lt glass reactor with two necks fitted with a sealed mechanical agitator and a water cooler connected to a graduated test tube for collecting the distillate:

| | |
|---|---|
| dimethyl ester of 2,5-furandicarboxylic acid (DMFD) | 20.15, g (0.110 moles) |
| dimethyl ester of terephthalic acid (DMT) | 38.24 g (0.197 moles) |
| sebacic acid | 26.54 g (0.131 moles) |
| 1,4-butanediol | 55.19 g (0.613 moles) |

Esterification Phase

The glass reactor was immersed in a thermostatically-controlled oil bath at a temperature of 200° C. and stirred continuously at 400 RPM.

Water and methanol are distilled during the reaction. Distillation was left to proceed for one hour, after which 100 ppm of tetraorthobutyl titanate (Tyzor®, marketed by DuPont) were added as an esterification catalyst and the temperature of the oil bath was gradually raised to 235° C. over the course of three hours. The conversion achieved, calculated as the ratio between the quantity of distillates retrieved during the reaction vis-à-vis the quantity theoretically obtainable was approximately 86%.

Polycondensation Phase

The water cooler was subsequently replaced with an air cooler fitted with a coded and graduated test-tube for the collection of the distillates and a further 1000 ppm of Tyzor® were added as the polycondensation catalyst. The pressure was reduced to 1 mbar over a period of approximately 10 minutes.

The reaction was protracted for 2 hours, bringing the temperature of the oil up to 240° C.

A product was obtained with an inherent viscosity measured in chloroform at 25° C. (2 g/l) according to the ASTM standard D 2857-89 equal to 0.87 dl/g.

The product was analysed with a Perkin Elmer Diamond scanning differential colorimeter using the procedure of Example 1, obtaining the following results:

Melting Temperature $(T_m)$=97° C.,

The polymer was characterised in as much as concerned with mechanical properties according to the ASTM D638 standard.

Mechanical Properties

| Stress at break (MPa) | 38 |
| --- | --- |
| Elongation at break (%) | 670 |
| Elastic modulus (MPa) | 60 |

Example 3

Synthesis of Poly(Butylene Furandicarboxylate-co-Butylene Terephthalate-co-Butylene Sebacate) with 10 mol % of Butylene Furandicarboxylate Units, 50 mol % of Butylene Terephthalate Units and 40 mol % of Butylene Sebacate Units The following were loaded in a 1 lt glass reactor with two necks fitted with a sealed mechanical agitator and a water cooler connected to a graduated test tube for collecting the distillate:

| dimethyl ester of 2,5-furandicarboxylic acid (DMFD) | 7.88 g (0.043 moles) |
| --- | --- |
| dimethyl ester of terephthalic acid (DMT) | 41.56 g (0.214 moles) |
| sebacic acid | 34.62 g (0.171 moles) |
| 1,4-butanediol | 53.93 g (0.599 moles) |

Esterification Phase

The glass reactor was immersed in a thermostatically-controlled oil bath at a temperature of 200° C. and stirred continuously at 400 RPM.

Water and methanol are distilled during the reaction. Distillation was left to proceed for one hour, after which 100 ppm of tetraorthobutyl titanate (Tyzor®, marketed by DuPont) were added as an esterification catalyst and the temperature of the oil bath was gradually raised to 235° C. over the course of three hours. The conversion achieved, calculated as the ratio between the quantity of distillates retrieved during the reaction vis-à-vis the quantity theoretically obtainable was approximately 88%.

Polycondensation Phase

The water cooler was subsequently replaced with an air cooler fitted with a coded and graduated test-tube for the collection of the distillates and a further 1000 ppm of Tyzor® were added as the polycondensation catalyst. The pressure was reduced to 1 mbar over a period of approximately 10 minutes.

The reaction was protracted for 2 hours, bringing the temperature of the oil up to 240° C.

A product was obtained with an inherent viscosity measured in chloroform at 25° C. (2 g/l) according to the ASTM standard D 2857-89 equal to 0.81 dl/g.

The product was analysed with a Perkin Elmer Diamond scanning differential colorimeter using the procedure of Example 1, obtaining the following results:

Melting Temperature $(T_m)$=107° C.,

The polymer was characterised in as much as concerned with mechanical properties according to the ASTM D638 standard.

Mechanical Properties

| Stress at break (MPa) | 25 |
| --- | --- |
| Elongation at break (%) | 900 |
| Elastic modulus (MPa) | 65 |

The products according to Examples 1-3 showed mechanical and thermal properties rendering them particularly suitable for the production of high strength films and extrusion coated products.

Example 4

Synthesis of Poly(Butylene Furandicarboxylate-co-Butylene Terephthalate-co-Butylene Sebacate) with 30 mol % of Butylene Furandicarboxylate Units, 30 mol % of Butylene Terephthalate Units and 40 mol % of Butylene Sebacate Units The following were loaded in a 1 lt glass reactor with two necks fitted with a sealed mechanical agitator and a water cooler connected to a graduated test tube for collecting the distillate:

| dimethyl ester of 2,5-furandicarboxylic acid (DMFD) | 23.85 g (0.130 moles) |
| --- | --- |
| dimethyl ester of terephthalic acid (DMT) | 25.15 g (0.130 moles) |
| sebacic acid | 34.92 g (0.173 moles) |
| 1,4-butanediol | 54.56 g (0.606 moles) |

Esterification Phase

The glass reactor was immersed in a thermostatically-controlled oil bath at a temperature of 200° C. and stirred continuously at 400 RPM.

Water and methanol are distilled during the reaction. Distillation was left to proceed for one hour, after which 100 ppm of tetraorthobutyl titanate (Tyzor®, marketed by DuPont) were added as an esterification catalyst and the temperature of the oil bath was gradually raised to 235° C. over the course of three hours. The conversion achieved, calculated as the ratio between the quantity of distillates retrieved during the reaction vis-à-vis the quantity theoretically obtainable was approximately 89%.

Polycondensation Phase

The water cooler was subsequently replaced with an air cooler fitted with a coded and graduated test-tube for the collection of the distillates and a further 1000 ppm of Tyzor® were added as the polycondensation catalyst. The pressure was reduced to 1 mbar over a period of approximately 10 minutes.

The reaction was protracted for 2 hours, bringing the temperature of the oil up to 240° C.

A product was obtained with an inherent viscosity measured in chloroform at 25° C. (2 g/l) according to the ASTM standard D 2857-89 equal to 0.65 dl/g.

The product was analysed with a Perkin Elmer Diamond scanning differential colorimeter using the procedure of Example 1, obtaining the following results:

Melting Temperature ($T_m$)=No melting peak detectable in the DSC analysis

The polymer was characterised in as much as concerned with mechanical properties according to the ASTM D638 standard.

Mechanical Properties

| | |
|---|---|
| Stress at break (MPa) | 11.5 |
| Elongation at break (%) | 1100 |
| Elastic modulus (MPa) | 13 |

The product according to Example 4 showed mechanical and rheological properties rendering it particularly suitable for the production of elastic bands and elastic fibers.

The polyesters according to Examples 1-4 were submitted to a biodegradation test according to EN 13432 standard. All the polyesters showed a relative biodegradability with respect to cellulose higher than 90% after 150 days, thus resulting biodegradable in industrial composting.

The invention claimed is:

1. A biodegradable aliphatic-aromatic polyester comprising units derived from at least one diol, at least one aliphatic dicarboxylic acid and two polyfunctional aromatic acids, characterized in that the units derived from said polyfunctional aromatic acids consist of:
   i. from 5-95% by moles, with respect to the total molar content of said polyfunctional aromatic acids, of units from at least one phthalic aromatic diacid selected from terephthalic acid, its esters and/or mixtures thereof;
   ii. from 95-5% by moles, with respect to the total molar content of said polyfunctional aromatic acids, of units from at least one heterocyclic aromatic diacid of renewable origin selected from 2,5-furandicarboxylic acid, its esters and/or mixtures thereof,
   wherein the content of said units derived from said polyfunctional aromatic acids is between 45% and 70% by moles, with respect to the total molar content of said dicarboxylic acids
   wherein said aliphatic dicarboxylic acid is selected from the group consisting of succinic acid, adipic acid, azelaic acid, sebacic acid, undecandioic acid, dodecandioic acid, brassylic acid and mixtures thereof;
   wherein the sum of units of said polyfunctional aromatic acid and of said aliphatic dicarboxylic acid amount to 100 mole % of the acid units; and wherein said polyester has a relative biodegradability according to the EN 13432 standard with respect to cellulose higher than 90% after 150 days.

2. The polyester according to claim 1, wherein said polyester is blended with one or more polymers.

3. A blend comprising the polyester according to claim 2, wherein said one or more polymers are selected from biodegradable polyesters of the diacid-diol, hydroxyacid or polyester-ether type.

4. The blend according to claim 3, wherein said polyesters of the diacid-diol type are aliphatic or aliphatic-aromatic.

5. The blend according to claim 4, wherein the content of said biodegradable polyesters from diacid-diol varies within the range between 1 and 99% by weight.

6. The blend according to claim 3, wherein said polyesters of the hydroxyacid type are selected from poly-L-lactic acid, poly-D-lactic acid and poly-D-L-lactic acid stereocomplex, poly-ε-caprolactone, polyhydroxybutyrate, polyhydoxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate, polyhydroxybutyrate octadecanoate and poly-3-hydroxybutyrate-4-hydroxybutyrate.

7. The blend according to claim 6, wherein the content of said biodegradable polyesters from hydroxy acid varies within the range between 1 and 99% by weight.

8. The blend comprising the polyester according to claim 2, wherein said one or more polymers are polymers of natural origin.

9. The blend according to claim 8, wherein said polymers of natural origin are selected from starch, cellulose, chitin, chitosan, alginates, proteins such as gluten, zein, casein, collagen, gelatin, natural rubbers, rosin acid and its derivatives, lignins and their derivatives.

10. The blend according to claim 9, wherein said starch is in destructurized or gelatinized form or in filler form.

11. The blend according to claim 9, wherein said starch represents an homogeneously dispersed phase of particles with mean dimensions of less than 1 μm.

12. The blend comprising the polyester according to claim 2, wherein said one or more polymers are selected from polyolefins, non-biodegradable polyesters, polyester- and polyether-urethanes, polyurethanes, polyamides, polyamino acids, polyethers, polyureas, polycarbonates and mixtures thereof.

13. The blend according to claim 12, wherein the content of said polyolefins, nonbiodegradable polyesters, polyester- and polyether-urethanes, polyurethanes, polyamides, polyamino acids, polyethers, polyureas, polycarbonates and mixtures thereof varies within the range from 0.5 to 99% by weight.

14. The blend comprising the composition according to claim 2, wherein said one or more polymers are selected from rigid polymers with a modulus greater than 1,500 MPa.

15. The blend according to claim 14, wherein the content of said rigid polymers varies within the range from 5 to 30% by weight.

16. The blend according to claim 15, wherein said rigid polymers form an homogeneously dispersed phase of particles with mean dimensions of less than 2 μm.

17. The blend according to claim 14, wherein said rigid polymers are polymers or copolymers of polylactic acid containing at least 75% of L-lactic or D-lactic acid or combinations thereof.

18. The blend comprising the composition according to claim 2, obtained by a reactive extrusion process with compounds carrying groups which can react with OH and/or COOH groups, or with unsaturated bonds.

19. Films, injection molding articles, extrusion coatings, fibers, foams, thermoformed articles, rubbers, glues, coatings, lacquers, thermosetting resins comprising the polyester according to claim 1 or blend thereof with one or more polymers selected from biodegradable polyesters of the diacid-diol, hydroxyacid or polyester-ether type.

20. A method which comprises shaping a polyester according to claim 1 or blend thereof with one or more polymers selected from biodegradable polyesters of the diacid-diol, hydroxyacid or polyester-ether type for the production of:
   mono- and bi-oriented films, and films multilayered with other polymeric materials;
   films for use in the agricultural sector;
   cling films for use with foodstuffs, for bales in agriculture, and for wrapping waste;
   bags and bin liners for the organic waste collection;
   seed dressings;
   glues;

thermoformed foodstuff packaging, both mono- and multi-layered;

coatings obtained using a extrusion coating method;

multilayer laminates with layers of paper, plastic, aluminum, or metalized films;

expanded or expandable beads for the production of pieces obtained by sintering;

expanded and semi-expanded products, including foam blocks formed using pre-expanded particles;

foam sheets, thermoformed foam sheets, and containers obtained from them for use in foodstuff packaging;

fruit and vegetable containers;

composites with gelatinized, destructurized and/or complexed starch, natural starch, flours or vegetable or inorganic natural fillers;

fibers, microfibers, composite micro fibers wherein the core is constituted by rigid polymers and the shell comprises said polyester or said blend thereof, blended composite fibers, fibers with different sections, from circular to multilobed, staple fibers, woven and non-woven fabrics or spun bonded or thermobonded for use in sanitary and hygiene products, and in the agricultural and clothing sectors.

\* \* \* \* \*